March 3, 1953     J. R. SNYDER     2,630,338
VALVED RING AND SPIGOT ASSEMBLY
Filed Aug. 28, 1948
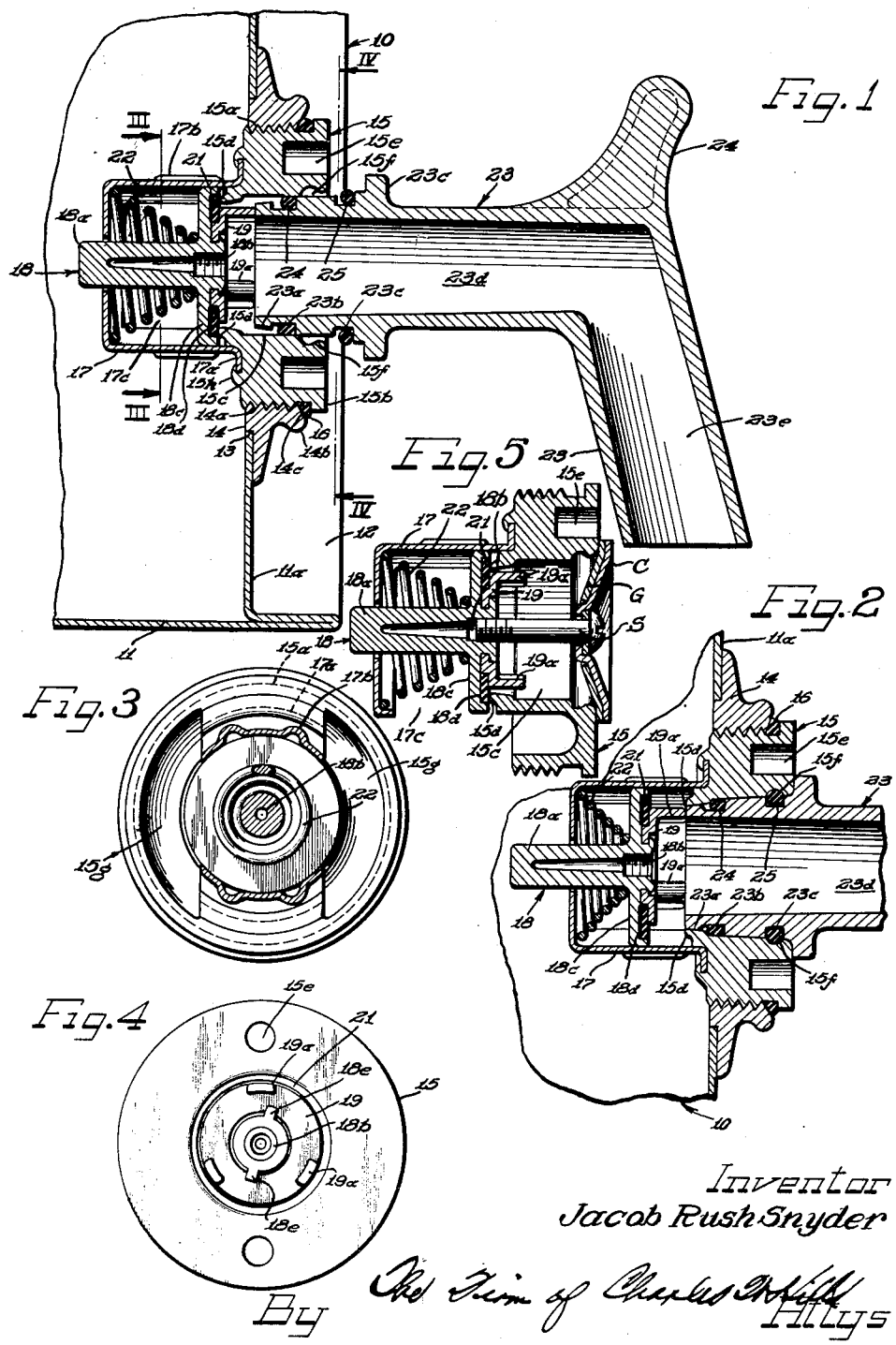
Inventor
Jacob Rush Snyder Patented Mar. 3, 1953

2,630,338

UNITED STATES PATENT OFFICE 2,630,338

VALVED RING AND SPIGOT ASSEMBLY

Jacob Rush Snyder, Cleveland, Ohio, assignor to Thompson Products, Inc., Cleveland, Ohio, a corporation of Ohio Application August 28, 1948, Serial No. 46,663

5 Claims. (Cl. 284—14)

1

This invention relates to a self-closing assembly for drainage of drums, barrels and the like containers.

More particularly, the invention relates to a valve-equipped assembly for a bung bushing which includes a detachable spigot for quickly opening the valve when the spigot is inserted into the bushing, and for effecting a quick sealing of the bushing when the spigot is withdrawn.

According to this invention, a bushing ring is equipped with a spring biased poppet type valve for closing a flow passage through the ring. The passage is adapted to journal the end of a drain spigot which carries a plurality of seal rings of the O ring type. One of these seal rings prevents leakage between the ring and spigot, and the other ring serves as a retainer to hold the spigot for opening the valve. This other ring acts as a releasable snap lock. The spigot member has a tapered end portion fitting snugly onto a tapered valve seat portion of the bushing ring so that the end face of the spigot does not appreciably reduce the size of the drain outlet. Therefore, the valve seat can present a relatively small effective area to the interior of the drum for minimizing fume and static load resistance to the actuation of the valve while maintaining a maximum area of flow.

An object of the present invention is to provide a cap and spigot assembly for drums, barrels and the like which permits rapid insertion and withdrawal of the spigot without destroying the hermetic sealing of the container.

A further object of the invention is to provide a valved closure cap and drain spigot assembly for drums, barrels and the like wherein seal rings on the spigot coact with annular recesses in the cap for sealing the spigot in the cap and for retaining the spigot to hold the valve of the cap in an open position.

Another object of this invention is to provide mating tapered walls on the spigot and cap so that the size of the valve seat can be reduced without reducing the drain capacity of the assembly.

A still further object of the invention is to provide a spring-loaded poppet valve equipped bushing ring for bung bushings.

Other and further objects of the invention will be apparent from the following description of the annexed sheets of drawings, which illustrate several preferred embodiments of the invention.

On the drawing:

Figure 1 is a fragmentary cross-sectional view of the end head of a drum equipped with a cap

2 and spigot assembly of this invention and illustrates the condition where the spigot is partially inserted into the cap, but where the valve is still closed;

Figure 2 is a view similar to Figure 1, but with the spigot completely inserted in the assembly and the valve open to permit drainage;

Figure 3 is a view taken along the line III—III of Figure 1;

Figure 4 is a view taken along the line IV—IV of Figure 1 with the spigot removed; and Figure 5 is a view similar to Figures 1 and 2 but showing a locking screw and cover arrangement for the cap to seal the assembly during transit or storage.

As shown on the drawing:

In Figures 1 and 2 the reference numeral 10 denotes a metal drum having a cylindrical side wall 11 equipped with an end head 11a. The configuration of the end head 11a provides recess 12 in the end of the drum. The end head 11a contains an opening 13 and a bung bushing 14 is sealingly attached to the end head 11a around this opening 13. The bung bushing 14 has internal threads 14a and a cylindrical neck terminating in bead 14b. A bushing ring 15 contains threads 15a in threaded engagement with threads 14a of the bushing. Out-turned flange 15b on the ring 15 overlies the mouth 14c of the bushing and acts to compress gasket 16 into sealing relationship between the bushing 14 and the ring 15.

The ring 15 has a central passage 15c and a valve-seating face 15d surrounding the inner end of the passage 15c. A pair of recessed portions 15e are found in the outer face of the ring 15 and are adapted for the insertion of a spanner wrench for tightening ring 15 into bung bushing 14.

As shown in Figure 3, the ring 15 has a pair of opposed recessed portions 15g extending over a portion of the inner face of ring 15 to lighten the weight of the ring and to direct flow into the ring.

An inverted cylindrical cup-shaped housing 17 containing end flange portions 17a around the open end thereof is secured to ring 15 as by peening over ring 15h to form overlying lips or heads 15h on the flanges 17a. The valve housing 17 slidably guides a poppet type valve 18. Ribs 17b are stamped on the side of the housing 17 to rigidify the housing. Ports 17c in the side of the housing provide for drainage access to the valve 18. This valve 18 has a hollow stem 18a slidable through a hole in the closed end of the housing 17 and counterbored and threaded at 18b to receive a locking screw S (Figure 5) depending from a cover C which spans the open outer end of the ring 15 and locks the valve 18 in closed position during transit or storage of the drum. A gasket G is interposed between the cover C and the ring to seal the passage 15c.

The valve 18 has a disk-like head 18c slidably guided by the side wall of the housing 17. The outer face of this head has an annular recess 18d so that the threaded end 18b of the stem forms an upstanding central portion in the recess receiving a washer 19 therearound. This washer contains a plurality of peripheral spaced lugs or fingers 19a extending into the passage 15c to engage the spigot when the latter is inserted into the ring 15.

The washer member 19 partially overlies a resilient gasket ring 21 seated in the recess 18d around a depressed portion of the washer. The ring 21 is made of material such as chloroprene rubber which can withstand attack by the fluid contained in the drum. The washer is held in the valve head 18d by ears or lugs 18e on the portion 18b of the valve.

A helical spring 22 surrounds the stem 18a and is compressed between the valve head 18c and the closed end of the housing 17 to urge the valve into closed position with the ring 21 seated against the seat 15d.

Figure 1 shows the assembly with a spigot 23 partially inserted (or partially removed from) the ring assembly. In this position, the valve 18 is closed.

The spigot 23 has an externally tapered end portion 23a tapered in conformity with the taper of the side of valve seat 15d to allow a close fit between the spigot and ring assembly. The tapered end portion 23a acts on the spaced lugs 19a to open the valve and presents a relatively small end face to the interior of the drum so that the spigot does not appreciably reduce the drainage capacity of the ring 15, and as a result the seat 15d can be of smaller diameter to reduce the effective loaded area of the valve 19. The load on the valve caused by fluid pressures in the drum is thereby minimized and valve actuation is facilitated.

The spigot has grooves 23b and 23c carrying O rings 24 and 25 made of resilient material such as chloroprene rubber and the like to seal the spigot 23 in the ring 15 while the ring 25 seats in the recessed portion 15f of the ring 15 to hold the spigot in valve opening position with the end of the spigot acting upon the fingers 19a as shown in Figure 2. A flanged portion 23c extends from the periphery of spigot 23 and limits the extent of insertion of the spigot 23 in the ring assembly through contact with ring 15 as shown best in Figure 2.

The spigot is provided with an operating handle 24 for easy manipulation thereof.

The interior of the spigot 23 is provided with an angled passage 23d and a downwardly extending discharge spout portion 23e.

From the above description, it will be understood that this invention provides a self-closing cap assembly for drums, barrels and other containers that is adapted to be readily inserted in a drum or barrel bushing and can selectively receive a demountable spigot for draining the contents of the container. The spigot is equipped with resilient O ring seals which also serve to hold the spigot in the cap. The cap is equipped with a spring-loaded poppet valve slidably guided in a ported housing on the cap.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a drum cap and spigot assembly for an internally threaded bung bushing which comprises a ring adapted to be secured in a bung bushing, said ring having a flow passage therethrough and a valve seat at one end thereof, an annular recess formed in said flow passage of said ring, a housing secured to said ring adjacent said valve seat, a poppet valve member mounted in said housing and slidable into and out of closing engagement with said valve seat, a spring member in said housing urging said valve member toward a closed position, a spigot slidably mounted in said flow passage of said ring engageable with said valve member for selectively opening said valve member, and a plurality of spaced apart resilient seal rings carried by said spigot slidably sealing said spigot in said flow passage of said ring, one of said seal rings selectively seating in said annular recess of said ring to retain said spigot in a predetermined axial position while the other of said seal rings seals said spigot in said flow passage of said ring.

2. In a drum cap and spigot assembly for an internally threaded bushing which comprises a ring adapted to be secured in a bung bushing, said ring having a flow passage therethrough, a valve seat at one end of said ring, an annular recess in the wall of said flow passage of said ring intermediate the ends thereof, a valve housing secured to said ring, a valve slidably mounted in said housing, a spring member mounted in said housing normally urging said valve member against said valve seat to close one end of said flow passage through said ring, a plurality of spaced lugs extending from one face of said valve member into said flow passage, a spigot slidably mounted in said flow passage of said ring, said spigot engageable with said lugs to open said valve, and a plurality of spaced apart seal rings carried by said spigot, at least one of said seal rings being received by said annular recess to hold said spigot in adjusted axial position and both of said seal rings engaging said ring to seal said spigot in said flow passage.

3. In a drum cap and spigot assembly for a bung bushing equipped container comprising a ring adapted to be secured in a bung bushing, said ring having a flow passage therethrough, a valve seat at the inner end of said ring, an annular groove in said flow passage, a spring-urged valve member mounted on said ring and engageable with said valve seat to control the flow of fluid through said flow passage, a spigot slidably mounted in said flow passage and carrying means engageable with said valve member for controlling opening and closing thereof, a seal on said spigot sealing said spigot in said flow passage when said valve is open and a resilient rib member on said spigot received by said annular groove to retain said spigot in valve-opening engagement in a said flow passage.

4. A device for controlling drainage from containers having drain ports which comprises a ring mountable in a drain port of container, a port housing mounted on the inner face of said ring, a poppet-type valve mounted in said housing, said valve having a stem extending through one end of said housing and a head engageable with the inner face of said ring to control the flow of fluid from said container through said ring, a spring surrounding said stem and held under compression between said valve and said housing normally urging said valve head into closing engagement with the inner face of said ring, spaced fingers on the head of said valve extending into said ring, a drain conduit member having an end portion inserted into said ring and engaged with said fingers to open said valve, a first seal member between said drain conduit member and said ring for preventing leakage therebetween when said valve is in an open position, and intermating locking means between said ring and said drain conduit member including a resilient ring member releasably retaining said drain conduit member in adjusted axial position within said ring, said drain conduit member being axially adjustable to maintain said valve in open position against the bias of said spring.

5. In a drum cap and spigot assembly for a bung bushing equipped container comprising a ring adapted to be secured in a bung bushing, said ring having a flow passage therethrough, a valve seat at the inner end of said ring, an annular groove in said flow passage, a spring-urged valve member mounted on said ring and engageable with said valve seat to control the flow of fluid through said flow passage, a spigot slidably mounted in said flow passage and carrying means engageable with said valve member for controlling opening and closing thereof, and annular ring means on said spigot sealing said spigot in said flow passage when said valve is open and including a resilient annular ring member on said spigot received by said annular groove to retain said spigot in valve-opening engagement in said flow passage.

JACOB RUSH SNYDER.

REFERENCES CITED

The following references are of record in the file of this patent:

UNITED STATES PATENTS

| Number | Name | Date |
|---|---|---|
| 635,693 | Linindoll | Oct. 24, 1899 |
| 889,952 | McGinley et al. | June 9, 1909 |
| 1,538,007 | Schellin | May 19, 1925 |
| 1,573,862 | Raber | Feb. 23, 1926 |
| 1,873,304 | DeMooy | Aug. 23, 1932 |
| 2,283,970 | Buttner | May 26, 1942 |
| 2,320,719 | Davies et al. | June 1, 1943 |
| 2,453,391 | Whittingham | Nov. 9, 1948 |
| 2,486,270 | Fawick | Oct. 25, 1949 |

FOREIGN PATENTS

| Number | Country | Date |
|---|---|---|
| 12,164 | Great Britain | May 16, 1914 |
| 543,733 | Great Britain | Mar. 10, 1942 |
| 564,926 | Great Britain | Oct. 19, 1944 |